US006823246B2

(12) United States Patent
Jackson et al.

(10) Patent No.: US 6,823,246 B2
(45) Date of Patent: Nov. 23, 2004

(54) MEASURING WHEEL BASE PARALLELISM WITH A POSITION DETERMINATION SYSTEM

(75) Inventors: David A. Jackson, Point Roberts, WA (US); Stephen L. Glickman, Los Gatos, CA (US); Hoshang Shroff, Cupertino, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 35 days.

(21) Appl. No.: 09/840,924

(22) Filed: Apr. 25, 2001

(65) Prior Publication Data

US 2002/0099483 A1 Jul. 25, 2002

Related U.S. Application Data

(60) Provisional application No. 60/199,366, filed on Apr. 25, 2000, and provisional application No. 60/214,390, filed on Jun. 28, 2000.

(51) Int. Cl.[7] .............................. G06K 9/00; G06K 7/00
(52) U.S. Cl. ........................................... 701/36; 33/264
(58) Field of Search ............................. 701/36; 33/227, 33/266, 263–264, 403, 203, 433–440, 452, 454, 203.12, 203.15–203.16, 203.18–203.19, 600, 644–645; 356/138, 139.04, 139.09, 139.1, 153–155; 382/100, 104, 106, 157

(56) References Cited

U.S. PATENT DOCUMENTS

| | | | |
|---|---|---|---|
| 3,187,440 A | 6/1965 | Merrill et al. | |
| 3,643,337 A | 2/1972 | Dick | |
| 4,110,913 A | 9/1978 | Dick | |

(List continued on next page.)

FOREIGN PATENT DOCUMENTS

| | | |
|---|---|---|
| DE | 19730524 C1 | 12/1998 |
| EP | 22258315 A | 2/1993 |
| EP | 0533143 | 3/1993 |
| EP | 0 757231 A1 | 5/1997 |
| WO | WO99/03018 | 1/1999 |

OTHER PUBLICATIONS www.math.com/school/subject3/lessons/S3U2L3DP.html "Quadrilaterals".*
www.mcps.k12.md.us/curriculum/math/frameworks.htm "Geometry A Final Exam Review Unit 3".*
Hunter Engineering CO. "Mercedes–Benz Wheel Alignment System" Operation Instructions, Hunter Engineering Co. Form No. 4292T, Nov., 1998, 44 pps.
Hunter Engineering Co. "SBDA—Suspension Body Dimension Audit Feature of WinAlign Software 3.0" Product Literature Form No. 4239T, Dec. 1998, 2 pps.

(List continued on next page.)

*Primary Examiner*—Thu V. Nguyen
(74) *Attorney, Agent, or Firm*—McDermott Will & Emery LLP

(57) ABSTRACT

Alignment between the wheels of a vehicle is determined using a position determination system and includes indicating wheel positions on the vehicle with targets; imaging the targets to obtain locations of the wheel positions; and calculating a relationship between the front and rear wheels. Alignment is aided by calculating rear and front wheel tracks and comparing the calculated front and rear wheel tracks to a specified range for the front and rear wheel tracks. Also, right and left wheel bases can be calculated and the calculated right and left wheel bases to can be compared a specified range for the right and left wheel bases. Measures of offset and skew can also be obtained. A computer-implemented position determination system for determining alignment between the wheels of a vehicle is disclosed.

11 Claims, 2 Drawing Sheets

U.S. PATENT DOCUMENTS

| | | | |
|---|---|---|---|
| 4,249,824 A | 2/1981 | Wiederrich et al. | |
| 4,311,386 A | 1/1982 | Coetsier | 356/155 |
| 5,014,227 A | 5/1991 | Kling et al. | |
| 5,165,177 A | 11/1992 | Kercheck | |
| 5,208,646 A | 5/1993 | Rogers et al. | |
| 5,220,399 A * | 6/1993 | Christian et al. | 356/139.09 |
| 5,488,472 A | 1/1996 | January | |
| 5,519,488 A | 5/1996 | Dale, Jr. et al. | 356/139 |
| 5,535,522 A | 7/1996 | Jackson | 33/288 |
| 5,553,389 A | 9/1996 | Winslow et al. | |
| 5,586,062 A | 12/1996 | Colarelli, III | 364/559 |
| 5,675,515 A | 10/1997 | January | 364/559 |
| 5,748,301 A | 5/1998 | Muller et al. | 356/155 |
| 5,812,256 A | 9/1998 | Chapin et al. | |
| 5,832,617 A | 11/1998 | Gill | |
| 5,875,418 A | 2/1999 | Gill et al. | |
| 5,943,783 A * | 8/1999 | Jackson | 33/203.18 |
| 5,978,077 A | 11/1999 | Koerner et al. | |
| 6,064,750 A * | 5/2000 | January et al. | 33/203.18 |
| 6,070,332 A | 6/2000 | Kane | |

OTHER PUBLICATIONS

Hunter Engineering Co. "SBDA—Suspension Body Dimension Audit Feature of WinAlign Software 3.0" Product Literature Form No. 4329T, May 1998, 2 pps.

Hunter Engineering, Co. "WinAlign Operation Manual, Version 3.0" Product Literature Form No. 3850T, Apr. 1998, select pages.

Hunter Engineering Co. "WinAlign Revision 3.0" Customer Software Release Notes No. RNF 10–P11–N, Apr. 3, 098, 13 pps.

* cited by examiner

MEASURING WHEEL BASE PARALLELISM WITH A POSITION DETERMINATION SYSTEM

CROSS REFERENCE TO RELATED APPLICATIONS

This application claims the benefit of U.S. Provisional Application No. 60/199,366 filed Apr. 25, 2000 and U.S. Provisional Application No. 60/214,390, filed on Jun. 28, 2000, incorporated herein by reference.

FIELD OF THE INVENTION

The present invention relates generally to motor vehicle alignment and, more specifically, to determining alignment of wheels relative to one another using a position determination system.

BACKGROUND OF THE INVENTION

Motor vehicle alignment systems are important for ensuring that the alignments of wheels on a vehicle are within the specifications provided by motor vehicle manufacturers. If the wheels are out of alignment, there may be excessive or uneven wear. In addition, the performance of the vehicle, particularly handling and stability, may be adversely affected if the wheels are not properly aligned. As used herein, the term "wheel" or "vehicle wheel" refers to the tire and wheel assembly found on a motor vehicle. Such an assembly generally includes a conventional tire that is mounted on a metal wheel or "rim."

The wheels of a motor vehicle may be aligned in a number of ways. For example, an operator or an alignment technician can use a vision imaging system such as a computer-aided, three-dimensional (3D) machine vision that employs optical sensing devices, such as cameras, to determine the positions of various objects. Although such machine vision systems are typically used for alignment purposes, these systems can also be used to obtain other positional and angular orientation information about a motor vehicle. Examples of such apparatus and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, each incorporated herein by reference. The apparatus disclosed in these patents is sometimes called a "3D aligner" or an "aligner," hereinafter referred to as a vision imaging system. As used herein, the term "position determination system" refers to an alignment system, such as the vision imaging system, in addition to other components used in conjunction with the alignment system to obtain positional and angular orientation information about a motor vehicle.

The above-described position determination system provides information, such as the centers of rotation of the vehicle's wheels, which aids in the wheel alignment of a vehicle. However, other information such as wheel parallelism, can also aid a technician in aligning the wheels of the vehicle. There is, therefore, a need for an improved method for using a position determination system capable of obtaining other positional information about a vehicle, such as wheel parallelism.

SUMMARY OF THE INVENTION

This and other needs are met by the present invention, which in accord with one aspect includes indicating wheel positions on the vehicle with targets; imaging the targets to obtain locations of the wheel positions; and calculating a relationship between the front and rear wheels. The calculation of the relationship between the front and rear wheels can include calculating a front wheel track extending between the two front wheels, calculating a rear wheel track extending between the two rear wheels, and comparing an angle between the calculated front wheel track and the calculated rear track to a specified range for the angle. Furthermore, the calculated front and rear wheel tracks can be compared to specified ranges for the front and rear wheel tracks as an aid to a technician in aligning the wheels.

In another aspect, the calculation of the relationship between the front and rear wheels can include calculating a right wheel base with right wheel base being defined as the distance of a line passing adjacent to one of the right wheels and also perpendicularly from the wheel track passing through the wheel to the wheel track passing through the other of the right wheels. Furthermore, the calculation can include calculating a left wheel base with the left wheel base being defined as the distance of a line passing adjacent one of the left wheels and also perpendicularly from the wheel track passing through the wheel to the wheel track passing through the other of the left wheels. Alternatively, the right wheel base can be defined as between the two right wheels and the left wheel base can be defined as between the two left wheels. The calculated right and left wheel bases can be then compared to specified ranges for the right and left wheel bases as an aid to a technician in aligning the wheels.

In a further aspect, the calculation of the relationship between the front and rear wheels can include calculating a front center point of the front wheel track; calculating a rear center point of the rear wheel track; defining a line originating from the center point of one of the front and rear wheel tracks and perpendicular thereto and intersecting the other of the front and rear wheel tracks; and calculating an offset distance from the intersection of the line with the other of the front and rear wheel tracks to the center point of the other of the front and wheel tracks. The calculated offset distance can then be compared to a specified range for offset distance as an aid to a technician in aligning the wheels.

In yet another aspect, the calculation of the relationship between the front and rear wheels can include calculating a first diagonal between the right, front wheel and the left, rear wheel; and calculating a second diagonal between left, front wheel and the right, rear wheel. After that, a difference between the first diagonal and the second diagonal can be calculated, and the calculated difference between the first diagonal and the second diagonal can be compared to a specified range for difference between the first diagonal and the second diagonal. Also, the calculated first diagonal can be compared to a specified range for the first diagonal, and the calculated second diagonal can be compared to a specified range for the second diagonal as an aid to a technician in aligning the wheels.

Additionally, a first skew angle can be calculated between the first diagonal and one of the wheel tracks; and a second skew angle can be calculated between the second diagonal and the one of the wheel tracks. After that, a difference between the first skew angle and the second skew angle can be calculated, and the calculated difference between the first skew angle and the second skew angle can be compared to a specified range for difference between the first skew angle and the second skew angle. Additionally, the calculated first skew angle can be compared to a specified range for the first skew angle, and the calculated second skew angle can be compared to a specified range for the second skew angle as an aid to a technician in aligning the wheels.

Additional advantages of the present invention will become readily apparent to those skilled in this art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE PREFERRED EMBODIMENTS

A position determination system is capable of obtaining positional information about a vehicle, such as the parallelism of the wheels. Also, the offset and skew of the wheel base can be obtained. This is achieved, in part, by the position determination system determining the spatial relationship of one or more positions by using one or more cameras to image targets associated with each of the positions to be measured. The position determination system operates by imaging a target and comparing the imaged target to a base image of the target. Because the view path of the camera is known, it is possible to determine the angles at which the target is oriented to the view path and the exact location of the target in three-dimensional space. The location of each position to be measured is then inferred from the location of the target associated with the position to be measured.

Figure 1:
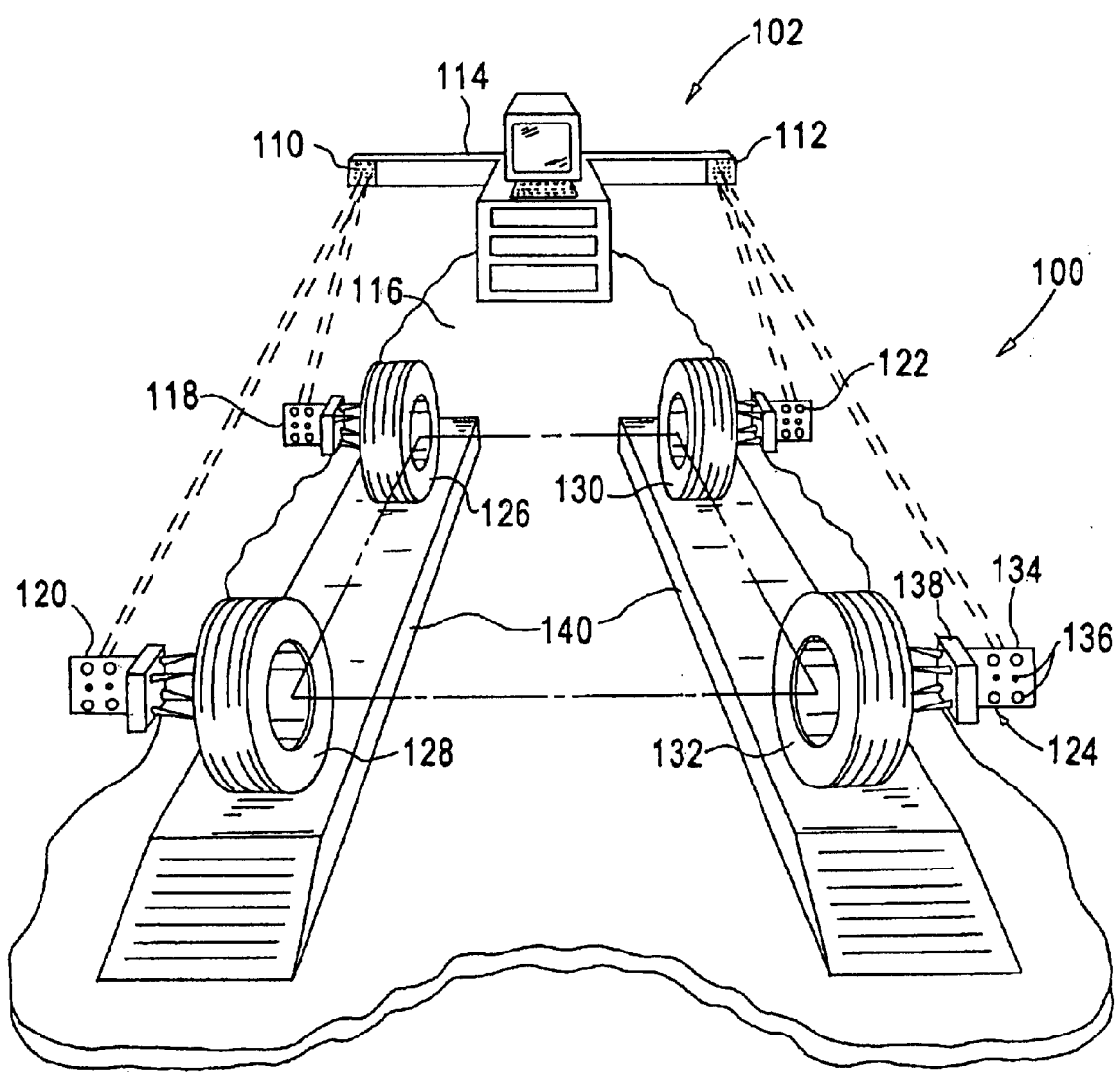
FIG. 1 is a perspective view of a position determination system and a vision imaging system.

An example of a position determination system is illustrated in FIG. 1. The position determination system 100 includes a vision imaging system 102 having a pair of fixed, spaced apart cameras 110, 112 mounted on a beam 114. The beam 114 has a length sufficient to position the cameras 110, 112 respectively outboard of the sides of the vehicle to be imaged by the position determination system 100. Also, the beam 114 positions the cameras 110, 112 high enough above the shop floor 116 to ensure that the two targets 118, 120 on the left side of the vehicle are both within the field of view of the left side camera 110, and two targets 122, 124 on the right side of the vehicle are both within the field of view of the right side camera 112.

Targets 118, 120, 122, 124 are mounted on each of the wheels 126, 128, 130, 132 of the motor vehicle, with each target 118, 120, 122, 124 including a target body 134, target elements 136, and an attachment apparatus 138. The attachment apparatus 138 attaches the target 118, 120, 122, 124 to wheel 126, 128, 130, 132. An example of an attachment apparatus is described in U.S. Pat. No. 5,024,001, entitled "Wheel Alignment Rim Clamp Claw" issued to Borner et al. on Jun. 18, 1991, incorporated herein by reference. The target elements 136 are positioned on the target body 134. Examples of target bodies 134 and target elements 136 acceptable for use in the invention are described in U.S. Pat. No. 5,724,743.

In operation, once the position determination system 100 has been calibrated using a calibration target (not shown), as described in the incorporated references, a vehicle can be driven onto the rack 140, and, if desired, the vehicle lifted to an appropriate repair elevation. The targets 118, 120, 122, 124, once attached to the wheel rims, are then oriented so that the target elements 136 on the target body 134 face the respective camera 110, 112. The vehicle and model year can then entered into the vision imaging system 102 along with other identifying parameters, such as vehicle VIN number, license number, owner name, etc.

The location of the targets 118, 120, 122, 124 relative to the rim of the wheels 126, 128, 130, 132 to which the targets are attached are typically known to an accuracy of about 0.01" and about 0.01°. Once the targets 118, 120, 122, 124 have been imaged in one position, the wheels 126, 128, 130, 132 are rolled to another position and a new image can be taken. Using the imaged location of the targets 118, 120, 122, 124 in the two positions, the actual position and orientation of the wheels 126, 128, 130, 132 and wheel axis can be calculated by the vision imaging system 102. Although the distance between the two positions varies, the distance is often approximately 8 inches.

Figure 2:
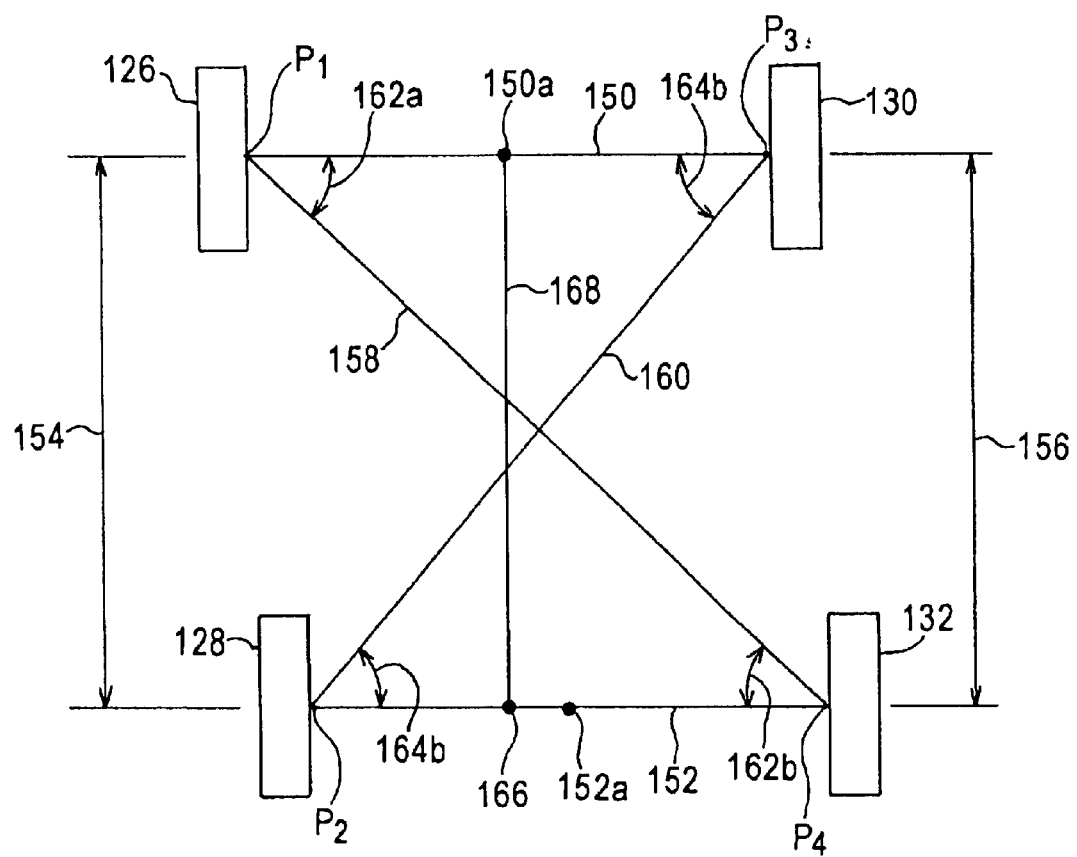
FIG. 2 is a schematic view of the points obtained by the position determination system that are used to obtain a measure of parallelism of the wheel bases.

FIG. 2 schematically illustrates information obtained about the wheels 126, 128, 130, 132, wheel track 150, 152, and wheel base 154, 156. As calculated by the position determination system 100, the front wheel track 150 extends between the two wheel positions $P_2$, $P_3$ used to define the locations of the two front wheels 126, 130 and has a center point 150a. Also, the rear wheel track 152 extends between the two wheel positions $P_2$, $P_4$ used to define the locations of the two rear wheels 128, 132 and has a center point 152a. The locations of the wheel positions $P_1$, $P_2$, $P_3$, $P_4$ are obtained from the position determination system 100 imaging the targets 118, 120, 122, 124 disposed on the wheels 126, 128, 130, 132. The right wheel base 154 is calculated as the distance between the two wheel positions $P_3$, $P_4$ used to define the locations of the two right wheels 126, 128. The left wheel base 156 is calculated as the distance between the two wheel positions $P_1$, $P_2$ used to define the positions of the two left wheels 130, 132. It should be noted that the wheel positions $P_1$, $P_2$, $P_3$, $P_4$ to define the positions of the wheels 126, 128, 130, 132 can be any common location along the axis of rotation of the wheels 126, 128, 130, 132. Also, the wheel base 154, 156 can be the perpendicular distance between the front wheels 126, 130 and the rear wheels 128, 132, as illustrated, or the wheel base 154, 156 can be the straight line distance between the wheel positions $P_1$, $P_3$ used to define the locations of the front wheels 126, 130 and the wheel positions $P_2$, $P_4$ used to define the positions of the rear wheels 128, 132.

Once calculated, the wheel track 150, 152 and wheel base 154, 156 can be compared, for example manually or by the position determination system, to a desired range for wheel track and wheel base for the particular vehicle being inspected. This comparison of the calculated wheel track 150, 152 and wheel base 154, 156 to a desired range can then be used by the technician as an aid in the alignment of the vehicle.

Another aid to the technician is to have the position determination system 100 compare the wheel tracks 150, 152 to each other with regard to parallelism and display the angular difference. The wheel tracks 150, 152 are perfectly parallel if the imaginary lines defined by the wheel tracks 150, 152 are 0° apart. The position determination system 100 can also display a desired range of the angle between the wheel tracks 150, 152, for example 0.00 to 0.50°, and indicate to the technician with the calculated angle is within the desired range.

The information obtained about the wheels 126, 128, 130, 132 can also include a measure of skew. When the figure defined by the wheels 126, 128, 130, 132 is a trapezoid or parallelogram instead of a rectangle, skew is a measure of the difference between the trapezoid or parallelogram with the square. For example, diagonal lines 158, 160 can be respectively drawn between the left, front wheel 126 and the right, rear wheel 132 and between the right, front wheel 130 and the left, rear wheel 128. One measure of skew is the difference between the length of these diagonal lines 158, 160. If, for example, diagonal line 158 is longer than diagonal line 160, the rear wheels 128, 130 are skewed to the right. Conversely, if diagonal line 158 is shorter than diagonal line 160, the rear wheels 128, 130 are skewed to the left. The position determination system 100 can display the length of the diagonal lines 158, 160 and can also compare the diagonal lines 158, 160 to each other. Additionally, the position determination system can compare the length of the diagonal lines to a desired range of lengths for the particular vehicle being measured.

Another measure of skew is to compare the skew angles 162a, 162b between the wheel tracks 150, 152 and the diagonal line 158 from the left, front wheel 126 to the right, rear wheel 132 and the skew angles 164a, 164b between the wheel tracks 150, 152 and the diagonal line 160 from the right, front wheel 130 to the left, rear wheel 128. If, for example, skew angles 162a, 162b are smaller than skew angles 164a, 164b, this indicates that the rear wheels 128, and the front wheels 130 are skewed to the right. Conversely, if skew angles 162a, 162b are larger than skew angles 164a, 164b, the rear wheels 128, and the front wheels 130 are skewed to the left. The position determination system 100 can display the skew angles 162a, 162b, 164a, 164b and can also compare skew the angles 162a, 162b, 164a, 164b to one another. Additionally, the position determination system can compare the skew angles 162a, 162b, 164a, 164b to a desired range of skew angles for the particular vehicle being measured.

A measure similar to skew is offset, which is defined as the distance from the center point ID 152a, 150a of the wheel track 152, 150 to an intersection point 166 of a line 168 with the wheel track 152, 150. The line 168 originates from the center point 150a, 152a of the other wheel track 150, 152 and is perpendicular to the other wheel track 150, 152. Two offset values can be obtained depending upon from which wheel track 150, 152 the line 168 originates perpendicularly. Also, depending upon the orientation of the wheel tracks 150, 152, the two offset values can be different from each other. If, however, the wheel tracks 150, 152 are parallel, the two offset values will be identical. In this manner, a comparison of the two offset values with each other can be used to determine whether the wheel tracks 150, 152 are parallel. The position determination system 100 can display one or both of the offset values and can compare the these offsets to each other. Additionally, the position determination system can compare one or both of the offsets to a desired range of offsets for the particular vehicle being measured.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method of determining alignment between the wheels of a vehicle using a position determination system that indicates wheel positions on the vehicle with targets, the method comprising the steps of:

imaging the targets to obtain locations of the wheel positions;

calculating the length of a right wheel base, the right wheel base being defined as the distance of a line passing adjacent a first right wheel and perpendicularly from the wheel track passing through the first right wheel to the wheel track passing through a second right wheel;

calculating the length of a left wheel base, the left wheel base being defined as the distance of a line passing adjacent a first left wheel and perpendicularly from the wheel track passing through the first left wheel to the wheel track passing through a second left wheel; and determining an alignment status by comparing the length of the right wheel base to a specified range for the right wheel base and comparing the length the left wheel base to a specified range for the left wheel base.

2. A method of determining alignment between the wheels of a vehicle using a position determination system that indicates wheel positions on the vehicle with targets, the method comprising the steps of:

imaging the targets to obtain locations of the wheel positions;

calculating the length of a right wheel base, the right wheel base being defined between the locations of the two right wheels;

calculating the length of a left wheel base, the left wheel base being defined between the locations of the two left wheels; and determining an alignment status by comparing the length of the right wheel base to a specified range for the right wheel base and comparing the length of the left wheel base to a specified range for the left wheel base.

3. A method of determining alignment between the wheels of a vehicle using a position determination system, comprising the steps of:

indicating wheel positions on the vehicle with targets;

imaging the targets to obtain locations of the wheel positions;

calculating a front wheel track, the front wheel track being defined between the location so f the two front wheels;

calculating a rear wheel track, the rear wheel track being defined between the locations of the two rear wheels;

calculating a front center point of the front wheel track;

calculating a rear center point of the rear wheel track;

defining a line originating from the center point of one of the front and rear wheel tracks and perpendicular thereto and intersecting the other of the front and rear wheel tracks; and calculating an offset distance from the intersection of the line with the other of the front and rear wheel tracks to the center point of the other of the front and rear wheel tracks.

4. The method according to claim 3, wherein the step of calculating the relationship between the front and rear wheels includes comparing the calculated offset distance to a specified range for offset distance.

5. A method of determining alignment between the wheels of a vehicle using a position determination system that indicates wheel positions on the vehicle with targets, the method comprising the steps of:

imaging the targets to obtain locations of the wheel positions;

calculating a first diagonal, the first diagonal being defined between the locations of the right, front wheel and the left, rear wheel;

calculating a second diagonal, the second diagonal being defined between the locations of left, front wheel and the right, rear wheel;

calculating a difference between the first diagonal and the second diagonal; and determining an alignment status based on the calculated difference between the first diagonal and the second diagonal.

6. A method of determining alignment between the wheels of a vehicle using a position determination system that indicates wheel positions on the vehicle with targets, the method comprising the steps of:

imaging the targets to obtain locations of the wheel positions;

calculating a first diagonal, the first diagonal being defined between the locations of the right, front wheel and the left, rear wheel;

calculating a second diagonal, the second diagonal being defined between the locations of left, front wheel and the right, rear wheel;

calculating a first skew angle, the first skew angle being defined as the angle between the first diagonal and one of the wheel tracks;

calculating a second skew angle, the second skew angle being defined as the angle between the second diagonal and the other of the wheel tracks; and determining an alignment status by comparing the first skew angle and the second skew angle;

wherein the step of determining an alignment status includes calculating a difference between the first skew angle and the second skew angle and comparing the calculated difference between the first skew angle and the second skew angle to a specified range for the difference between the first skew angle and the second skew angle.

7. A computer-implemented position determination system for determining alignment between the wheels of a vehicle, comprising:

one or more targets for indicating wheels positions on the vehicle; and a vision imaging system for imaging the targets to obtain locations of the wheel positions and for determining an alignment status;

wherein the vision imaging system calculates the length of a right wheel base and the length of a left wheel base with the right wheel base being defined as the distance of a line passing adjacent a first of the right wheels and perpendicularly from the wheel track passing through the first right wheel to the wheel track passing through a second of the right wheels and the left wheel base being defined as the distance of a line passing adjacent a first of the left wheels and perpendicularly from the wheel track passing through the first left wheel to the wheel track passing through a second of the left wheels; and wherein the vision imaging system determines the alignment status by comparing the length of the right wheel base to a specified range for the right wheel base and comparing the length of the left wheel base to a specified range for the left wheel base.

8. A computer-implemented position determination system for determining alignment between the wheels of a vehicle, comprising:

one or more targets for indicating wheels positions on the vehicle; and a vision imaging system for imaging the targets to obtain locations of the wheel positions and for determining an alignment status;

wherein the vision imaging system calculates the length of a right wheel base and the length of a left wheel base with the right wheel base being defined between the locations of the two right wheels and the left wheel base being defined between the locations of the two left wheels; and wherein the vision imaging system determines the alignment status by comparing the length of the right wheel base to a specified range for the right wheel base and comparing the length of the left wheel base to a specified range for the left wheel base.

9. A computer-implemented position determination system for determining alignment between the wheels of a vehicle, comprising:

one or more targets for indicating wheels positions on the vehicle; and a vision imaging system for imaging the targets to obtain locations of the wheel positions and for calculating a relationship between the front and rear wheels of the vehicle;

wherein the vision imaging system calculates a front wheel track and a rear wheel track with the front wheel track being defined between the locations of the two front wheels and the rear wheel track being defined between the locations of the two rear wheels; and wherein the vision imaging system:

calculates a front center point of the front wheel track and a rear center point of the rear wheel track;

defines a line originating from the center point of one of the front and rear wheel tracks and perpendicular thereto and intersecting the other of the front and rear wheel tracks; and calculates an offset distance from the intersection of the line with the other of the front and rear wheel tracks to the center point of the other of the front and rear wheel tracks.

10. The system according to claim 9, wherein the calculation of the relationship between the front and rear wheels includes comparing the calculated offset distance to a specified range for offset distance.

11. A position determination system for determining a skew status of a vehicle, comprising:

a vision imaging system for imaging targets attached to the wheels of the vehicle to obtain locations of wheel positions and for determining the skew status based on the length of a first diagonal and the length of a second diagonal;

wherein the first diagonal is defined between the locations of the right, front wheel and the left, rear wheel and the second diagonal is defined between the locations of left, front wheel and the right, rear wheel; and wherein the vision imaging system determines the skew status by calculating a difference between the length of the first diagonal and the length of the second diagonal and comparing the calculated difference between the length of the first diagonal and the length of the second diagonal to a specified range for the difference between the length of the first diagonal and the length of the second diagonal.

* * * * *